United States Patent [19]

Bruning et al.

[11] Patent Number: 5,559,396
[45] Date of Patent: Sep. 24, 1996

[54] BALLAST FILTERING SCHEME FOR REDUCED HARMONIC DISTORTION

[75] Inventors: Gert W. Bruning, No. Tarrytown, N.Y.; Pawel M. Gradzki, Milford, Conn.

[73] Assignee: Philips Electronics North America Inc., New York, N.Y.

[21] Appl. No.: 323,209

[22] Filed: Oct. 14, 1994

[51] Int. Cl.$^6$ ................................................ H02M 1/12
[52] U.S. Cl. .................. 315/291; 315/209 R; 315/244; 363/47; 363/48; 333/175; 333/176; 333/177; 333/181
[58] Field of Search ................................. 363/47, 48, 46, 363/45; 323/205, 208; 315/239, 209 R, 244, 291; 333/175, 176, 177, 181

[56] References Cited

U.S. PATENT DOCUMENTS

| | | | |
|---|---|---|---|
| 4,672,522 | 6/1987 | Lesea | 363/48 |
| 4,686,427 | 8/1987 | Burke | 315/219 |
| 4,937,719 | 6/1990 | Yamada et al. | 363/39 |
| 5,021,716 | 6/1991 | Lesea | 315/219 |
| 5,047,691 | 9/1991 | Lesea et al. | 315/244 |
| 5,148,359 | 9/1992 | Nguyen | 363/48 |
| 5,148,360 | 9/1992 | Nguyen | 363/48 |

OTHER PUBLICATIONS

Electronics Engineer's Reference Book, Fifth Edition, Edited By F. F. Mazda, First Published 1983, pp. 36/3–36/7.

*Primary Examiner*—Robert Pascal
*Assistant Examiner*—Arnold Kinkead
*Attorney, Agent, or Firm*—Edward Blocker; Bernard Franzblau

[57] ABSTRACT

A ballast filter in which the ballast can operate at a total harmonic distortion of power line current of less than 10%. Power dissipated by the filter when at a THD of less than 10% is relatively low. The input impedance of the ballast is chosen to be no greater than twice the equivalent filter impedance of a front end filter and no less than the equivalent filter impedance/1.5. The filter includes a transformer having a core which at times operates within the non-linear region of its B-H curve under nominally rated ballast load conditions.

16 Claims, 5 Drawing Sheets

BALLAST FILTERING SCHEME FOR REDUCED HARMONIC DISTORTION

BACKGROUND OF THE INVENTION

This invention relates generally to a ballast filter and, more particularly, to a ballast filtering scheme for reduced harmonic distortion.

Total harmonic distortion (THD) is a term which reflects and can be calculated to determine the amount of harmonic distortion present in current supplied to a ballast from a utility power line. Electronic ballasts are well known for drawing line current rich in harmonic content. Filters are provided at the front end of an electronic ballast to limit the harmonics drawn from the utility power line.

Many conventional electronic ballasts operate at a THD ranging from about 14% to 18% through the use of an LC low pass filter. Demands recently imposed by the utility industry as well as by the general public typically require the line current THD drawn by the ballast to be less than 10%.

In meeting this lower THD level, a conventional LC filter must increase its low pass attenuating characteristics at the sacrifice of efficiency, that is, by consuming far more power.

It is therefore desirable to provide an improved ballast filtering scheme in which the THD can be reduced while maintaining a relatively high ballast efficiency, that is, without a substantial increase in power dissipation of the ballast filter.

SUMMARY OF THE INVENTION

Generally speaking, in accordance with a first aspect of the invention, a ballast having a ballast input for receiving from a utility power line under nominally rated ballast load conditions an alternating current having a peak amplitude and characterized by a ballast input impedance $Z_{IN}$ as measured across the ballast input further includes a filter. The filter is coupled to the ballast input and includes a filter output, an inductor having a core and a capacitor. The capacitor is coupled to the filter output and at least a portion of the inductor. The filter is characterized by an equivalent impedance $Z_{eq}$. The core is substantially characterized by a B-H curve having a substantially linear region and a substantially non-linear region with a substantially uniform flux density existing throughout the core when in the non-linear region of its B-H curve. Under nominally rated ballast load conditions, the core operates within the non-linear region of its B-H curve at least when at the peak amplitude of the alternating current. The relationship between the equivalent impedance $Z_{eq}$ and ballast input impedance $Z_{IN}$ under nominally rated ballast load conditions varies as follows: $0.5 \leq Z_{eq}/Z_{IN} \leq 1.5$.

The filter through the varying relation between equivalent impedance $Z_{eq}$ and ballast input impedance $Z_{IN}$ in combination with the inductor core operating within the non-linear region of its B-H curve when at least at the peak amplitude of the alternating current provides sufficient harmonic attenuation to ensure an acceptable THD level of less than 10% while maintaining a relatively high ballast efficiency. In particular, by limiting the ballast input impedance $Z_{IN}$ to being no greater than twice the equivalent impedance $Z_{eq}$, the level of THD is maintained at an acceptable level. As ballast input impedance $Z_{IN}$ begins to approach equivalent impedance $Z_{eq}$, the THD is continually lowered. Ballast efficiency is maintained at a relatively high level by operating the core within the non-linear region of its B-H curve at levels approaching as well as at the peak amplitude of the alternating current drawn by the ballast.

It is a feature of the invention that the capacitor be coupled between the ballast input and the filter output. Alternatively, the capacitor can be coupled between a tap of the inductor and one of the filter output and ballast input. It is another feature of the invention that an additional inductor and a resistor be serially connected to the capacitor to further lower the level of THD.

In accordance with another aspect of the invention, a method of operating a ballast having a ballast input, an input impedance $Z_{IN}$ as measured across the ballast input and a filter characterized by an equivalent impedance $Z_{eq}$ and coupled to the ballast input and including a filter output, comprises the steps of receiving at the ballast input from a utility power line under nominally rated ballast load conditions an alternating current having a peak amplitude and drawing the alternating current through the filter. The filter further includes an inductor having a core and a capacitor. The capacitor is coupled to at least a portion of the inductor and the filter output. The method further includes the step of varying the relationship between the equivalent impedance $Z_{eq}$ and the ballast input impedance $Z_{IN}$ under nominally rated ballast load conditions such that $0.5 \leq Z_{eq}/Z_{IN} \leq 1.5$. The core is substantially characterized by one B-H curve having a substantially linear region and a substantially non-linear region with a substantially uniform flux density existing throughout the core when in the non-linear region. In operating the ballast, the core is maintained within the non-linear region of its B-H curve when at least at the peak amplitude of the alternating current under nominally rated ballast load conditions.

It is a feature of this second aspect of the invention that the method further includes the step of filtering harmonics by passing a portion of the harmonics through the capacitor.

Accordingly, it is an object of the invention to provide an improved ballast filtering scheme for reducing harmonic distortion.

It is another object of the invention to provide an improved ballast filtering scheme which maintains a relatively high ballast efficiency.

It is yet another object of the invention to provide an improved ballast filtering scheme in which the ballast operates at a THD of less than 10% without consuming a substantial increase in power losses.

Still other objects and advantages of the invention will, in part, be obvious and will, in part, be apparent from the specification.

The invention accordingly comprises several steps in the relation of one or more such steps with respect to each of the others, and a device embodying features of construction, combination of elements, and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
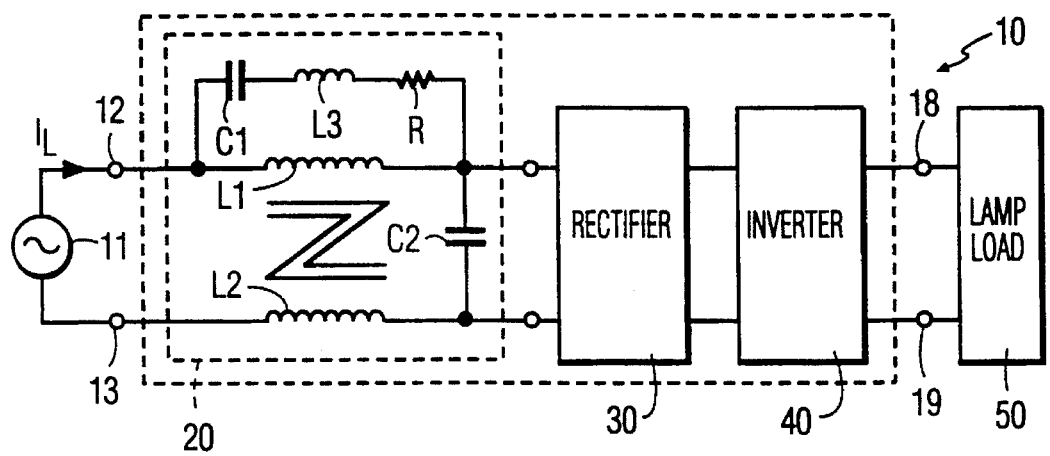
FIG. 1 is a partial block diagram and partial electrical schematic of a ballast in accordance with the invention.

Referring now to FIG. 1, a ballast 10 includes a filter 20, a rectifier 30 and an inverter 40. A utility power line nominally at a voltage $V_L$ and supplying a line current $I_L$ to ballast 10 is represented by an AC source 11. Source 11 is connected to a pair of input terminals 12 and 13 of ballast 10.

Filter 20 serves, in part, to remove any electromagnetic interference (EMI) from reaching the utility power line from ballast 10. The filtered AC signal is supplied to rectifier 30 through a pair of filter output terminals 14 and 15. Rectifier 30, which typically is either of the half-bridge or full-bridge type, produces a varying DC signal to inverter 40. Although not shown in FIG. 1, the voltage produced by rectifier 30 can be boosted through any well known technique such as, but not limited to, a voltage doubler, up-converter or the like in providing a suitable, relatively steady state DC voltage to the input of inverter 40. Inverter 40 can be, but is not limited to, a current fed, half-bridge type and provides an alternating signal across a pair of output terminals 18 and 19 of ballast 10 for powering a lamp load 50.

Filter 20 includes a transformer T having a magnetic core and a pair of inductors L1 and L2. Inductors L1 and L2 are commonly referred to as a split choke or coupled inductor. Inductor L1 is connected between ballast input terminal 12 and filter output terminal 14. Also connected between ballast input terminal 12 and filter output terminal 14 is the serial combination of a capacitor C1, an inductor L3 and a resistor R. The serial combination need not be connected to ballast input terminal 12. For example, connection also can be made to a tap of inductor L1 depending, in part, on the attenuation required. Capacitor C1 should therefore be considered as being coupled to at least a portion of inductor L1 and filter output terminal 14. Inductors L1 and L2 also can be designed as a single inductor with the serial combination of capacitor C1, inductor L3 and resistor R connected at one end to a tap of this single inductor and at the other end to filter output terminal 14.

Connected between ballast input terminal 13 and filter output terminal 15 is inductor L2. One end of capacitor C2 is connected to the junction joining together inductor L1, resistor R and filter output terminal 14. The other end of capacitor C2 is connected to the junction joining together inductor L2 and filter output terminal 15.

Inductor L3 serves along with capacitor C1 to attenuate, in part, the EMI exiting ballast 10 into AC source 11. Resistor R serves to lower the Q of the resonant circuit formed by inductor L3 and capacitor C2.

The combination of capacitor C2 and inductors L1 and L2 is tuned to just about the third harmonic of power line current $I_L$. Inductor L1 and capacitor C1 serve to attenuate higher harmonics. Capacitor C2 also slows down the transition period in the rectangular waveform generated by rectifier 30. Other harmonics generated by rectifier 30 as seen by filter 20 are also filtered by inductor L1.

Typical nominal filter component values for a lamp load of two 40 watt, 120 volt series connected fluorescent lamps include resistor R at 33 ohms, ½ watt; capacitor C1 at 1.3 microfarad; capacitor C2 at 2.8 microfarad; inductor L3 at 820 microhenries and transformer T at 69 watts, 120 volts, 60 Hz.

Figure 2:
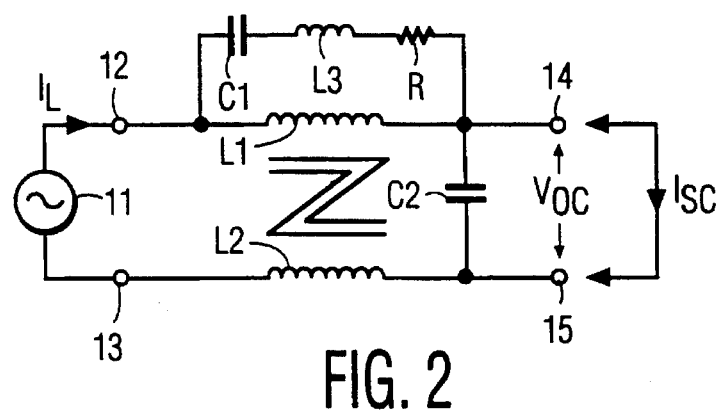
FIG. 2 is an electrical schematic of the filter of FIG. 1 illustrating the measurements to be taken in determining its equivalent impedance.

Referring now to FIG. 2, filter 20 can be defined by an equivalent impedance $Z_{eq}=V_{oc}/I_{sc}$. Voltage $V_{oc}$ is the open circuit voltage across filter output terminals 14 and 15. Current $I_{sc}$ is the short circuit current flowing between output terminals 14 and 15. An AC source 11' is one fourth the nominal line voltage $V_L$ of AC source 11.

Figure 3:
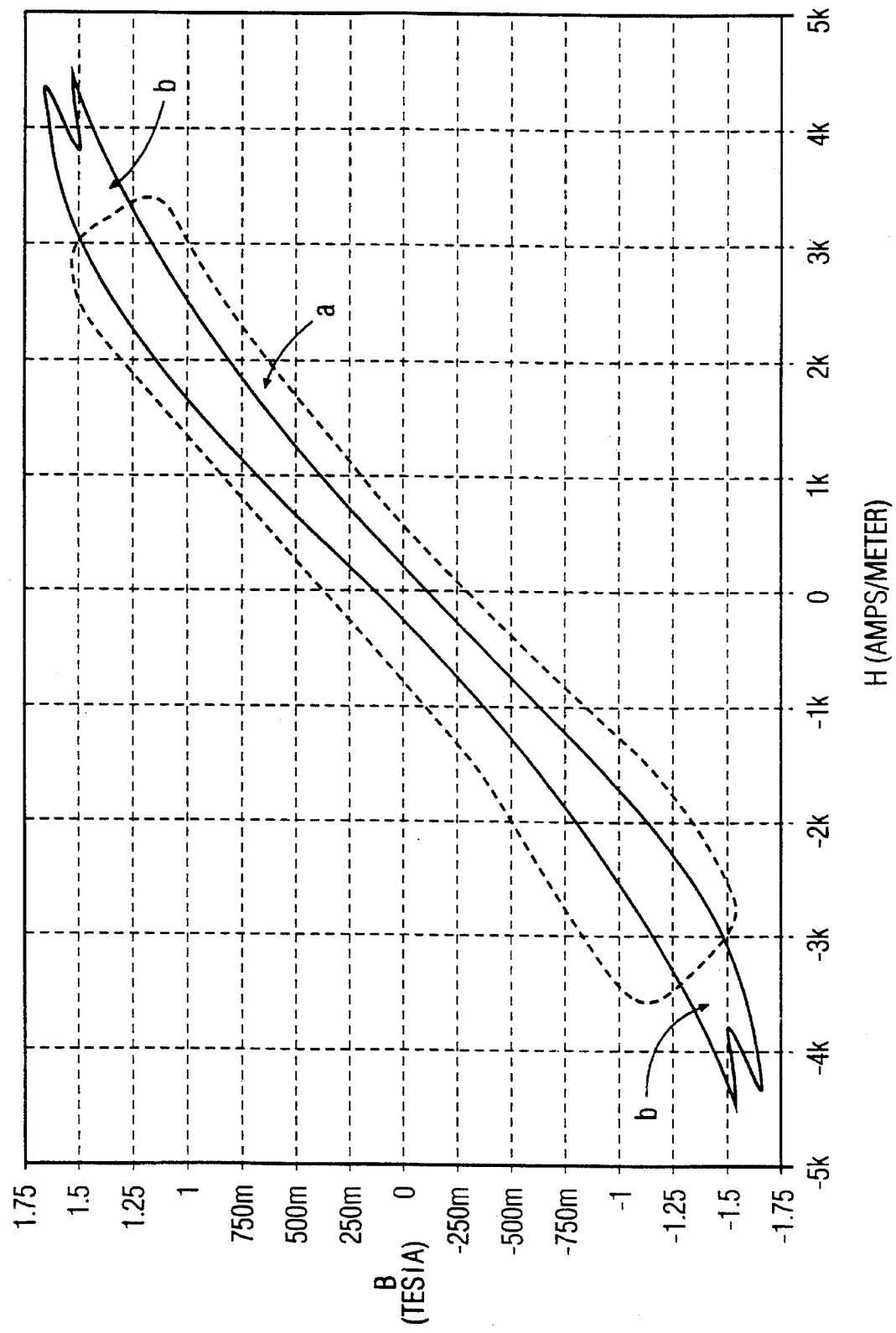
FIG. 3 is a B-H curve of a transformer core within the filter of FIG. 1 traversed under nominal excitation.
Figure 4:
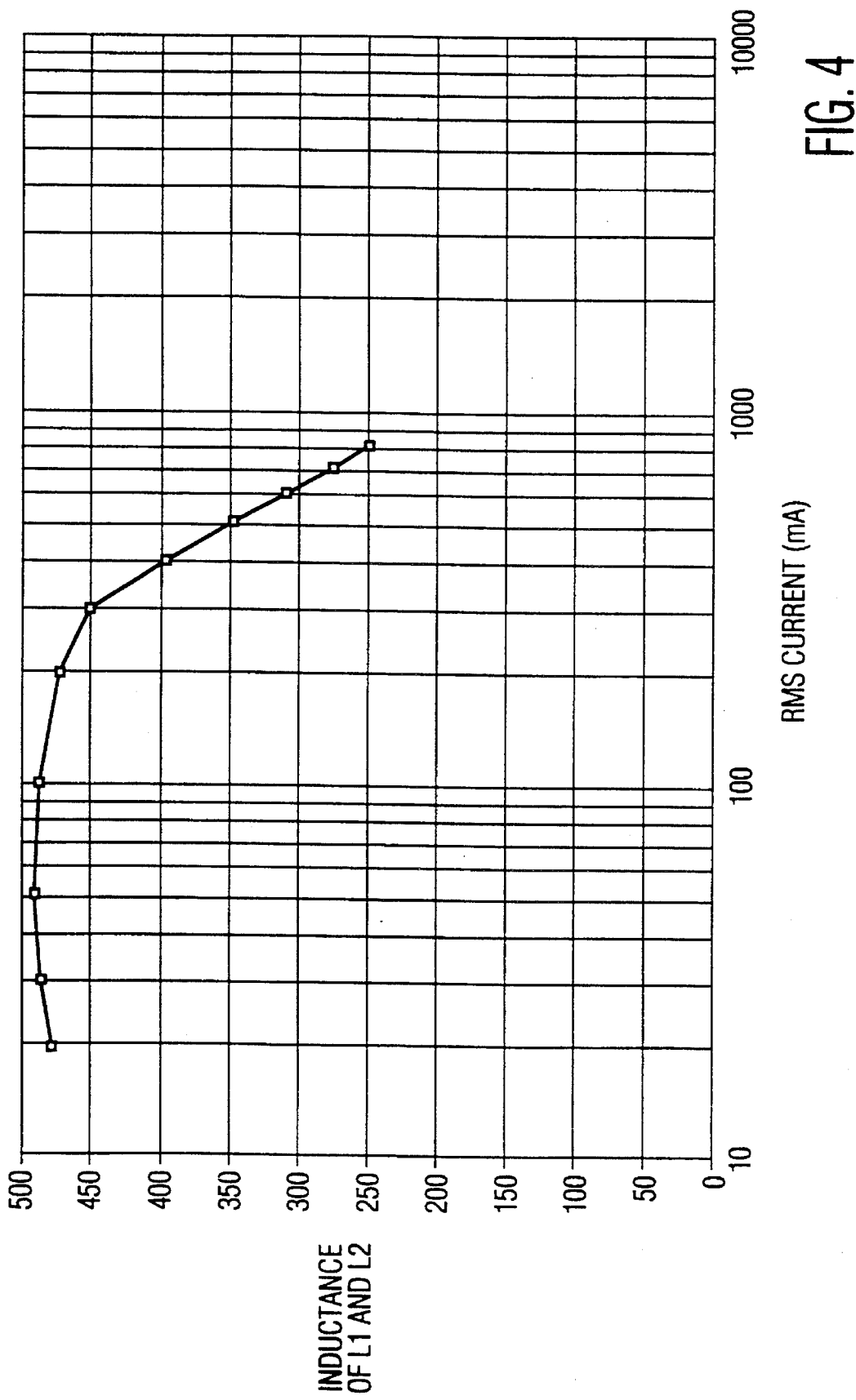
FIG. 4 is a plot of ballast filter inductance versus current flow through the inductance with the filter output short circuited.

As shown in FIG. 3, the core associated with the split choke/coupled inductor of filter 20, that is, the core associated with inductors L1 and L2 is substantially characterized by a B-H curve having a substantially linear region a and substantially non-linear regions b. As shown in FIG. 4, the inductance of inductors L1 and L2 is designed to operate within non-linear regions b at and near the peak amplitude of the alternating line current $I_L$. In particular, the core operates within its non-linear region when at the peak amplitude of the alternating line current $I_L$ under nominally rated ballast load conditions. Power losses consumed by the core under nominally rated ballast load conditions are therefore minimized.

The plot of inductance in millihenries versus RMS line current in milliamps, shown in FIG. 4, is based on a 59 watt ballast inductance (i.e. combination of inductors L1 and L2) at 120 Volts under unloaded conditions, that is, without connection of lamp load 50 to ballast 10. Operation within the non-linear region of this B-H curve begins when current flowing through the inductance increases beyond about 100 milliamps.

In contrast thereto, a conventional ballast filter having a split choke/coupled inductor operates substantially within the linear region rather than the non-linear region of the associated core's B-H curve when under nominally rated ballast load conditions. Undesirable power losses within the conventional filter result.

Figure 5:
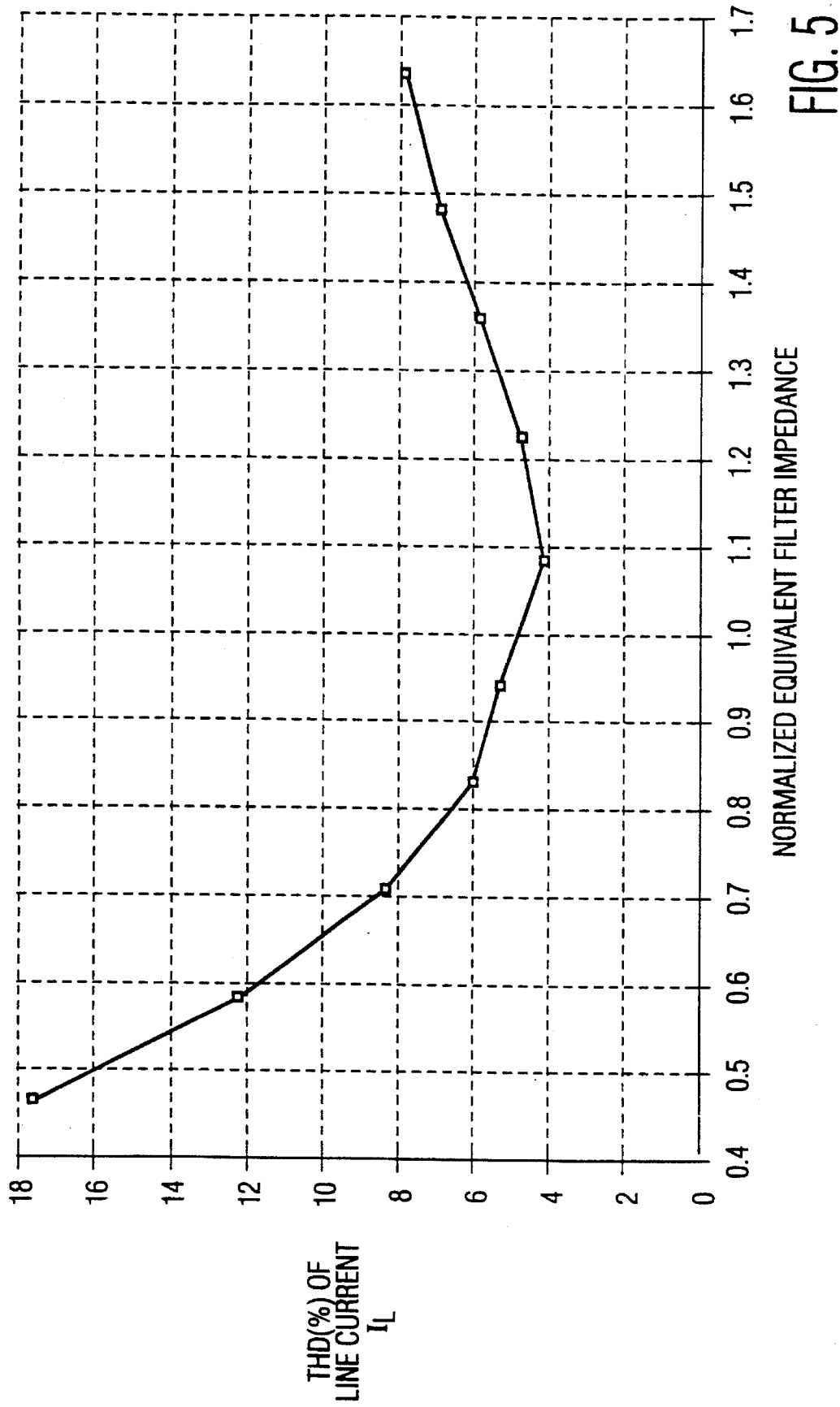
FIG. 5 is a plot of THD versus the normalized equivalent filter impedance under nominal excitation.

Referring now to FIG. 5, a plot of the THD within power line current $I_L$ versus the normalized equivalent impedance of filter 20 is shown. As used herein, $THD=\sqrt{\Sigma I_n^2/I_1^2}$, wherein $I_1$ is that component of current $I_L$ at the fundamental frequency, n=an integer greater than 1 and $I_n$ is a harmonic of current $I_L$. In other words, $I_L=\sqrt{I_1^2+I_2^2+...}$. The normalized equivalent impedance of filter 20 is defined as the ratio of $Z_{eq}/Z_{IN}$.

Figure 6:
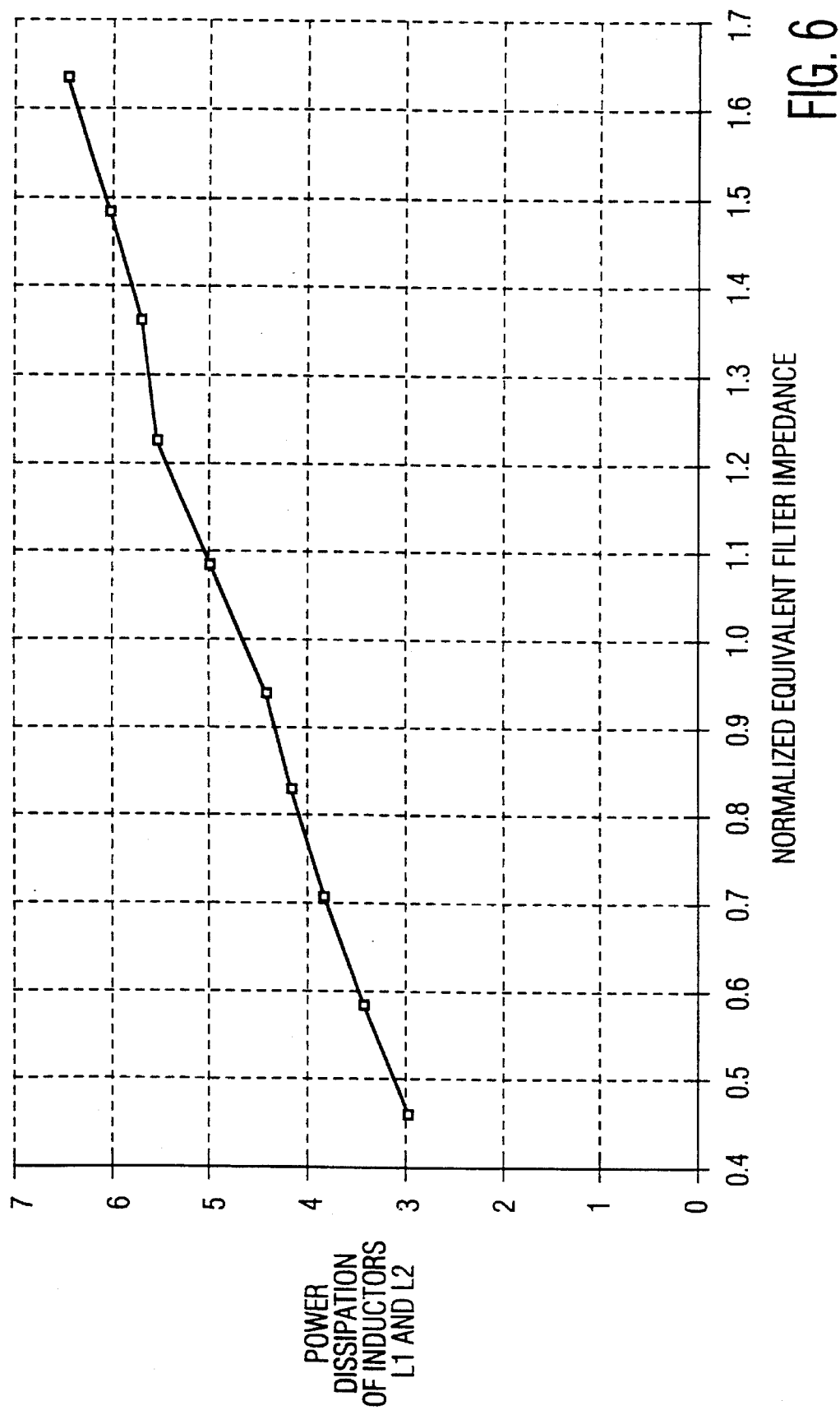
FIG. 6 is a plot of the power dissipated by the filter inductance versus the normalized equivalent filter impedance under nominal excitation.

The relationship of THD to the normalized equivalent impedance of filter 20 shown in FIG. 5 is based on a nominally rated 69 watt ballast having a transformer T with a core volume of approximately 27.3 cm$^3$. In order to maintain a THD of approximately 16 percent or less, the normalized equivalent impedance of filter 20 is equal to or greater than 0.5. In limiting losses dissipated by inductors L1 and L2 as current $I_L$ increases, this ratio is preferably no greater than 1.5. As shown in FIG. 6 for a nominally rated 69 watt ballast having a transformer T with a core volume of 27.3 cm$^3$, power dissipated by inductors L1 and L2 ranges between about 3.2 watts and about 6 watts when the normalized equivalent filter impedance is at 0.5 and 1.5, respectively.

By operating in the non-linear region of the B-H curve of the core associated with inductors L1 and L2, at least when at or near the peak amplitude of current $I_L$, the relationship between equivalent impedance $Z_{eq}$ and ballast input impedance $Z_{IN}$ varies as follows: $0.5 \leq Z_{eq}/Z_{IN}$ (normalized equivalent filter impedance). Beyond the desirable upper limit of this ratio, that is, at a value greater than 1.5, unacceptably high power losses associated with inductors L1 and L2 results.

The balance struck between THD and power dissipated by filter 20 is achieved by limiting the normalized equivalent impedance of filter 20 to a range between and including 0.5 and 1.5. The level of THD can be further limited by raising the minimum value of the normalized equivalent filter impedance so as to conform to the 10% or less range recently imposed by several power utilities. More particularly, for a 69 watt nominally rated ballast, the normalized equivalent filter impedance can be set to a value of at least 0.65 but no greater than 1.5 such that the THD can be maintained at 10% or less.

The advantageous combination of low THD and relative low inductive power losses at nominally rated ballast load conditions is based, in part, on (1) operating substantially the entire core of transformer T within its non-linear region when near and at the peak amplitude of current $I_L$ and (2) coupling capacitor C1 between at least a portion of inductor L1 and filter output terminal 14.

As can now be readily appreciated, the invention provides an improved method and device for filtering of THD at acceptable levels of power consumption by filter 20. In particular, by maintaining the normalized equivalent impedance of filter 20 ($Z_{eq}/Z_{IN}$) at no less than 0.5 and no greater than 1.5, an acceptable level of THD can be achieved. When the THD is to be maintained at 10% or less, the normalized equivalent impedance of filter 20 is increased as required above the minimum level of 0.5.

It will thus be seen that the objects set forth above and those made apparent from the preceding description are efficiently attained and since certain changes may be made in the above construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A ballast having an input for receiving from a utility power line, under nominally rated ballast load conditions, an alternating current having a peak amplitude and characterized by a ballast input equivalent impedance $Z_{IN}$ as measured across the ballast input and further comprising a filter characterized by an equivalent impedance $Z_{eq}$, coupled to the ballast input and including a filter output, an inductor having a core and a capacitor coupled to the output of the filter and at least a portion of the inductor, the core being substantially characterized by a B-H curve having a substantially linear region and a substantially non-linear region with a substantially uniform flux density existing throughout the core when in the non-linear region of its B-H curve, wherein, under nominally rated ballast load conditions, the core operates within the non-linear region of its B-H curve when at least at the peak amplitude of the alternating current and the relationship between the equivalent impedance $Z_{eq}$ and input impedance $Z_{IN}$ is as follows: $0.5 \leq Z_{eq}/Z_{IN} \leq 1.5$.

2. The ballast of claim 1, wherein the capacitor is coupled between the input of the ballast and the output of the filter.

3. The ballast of claim 1, further including an additional inductor and a resistor serially connected to the capacitor.

4. The ballast of claim 2, further including an additional inductor and a resistor serially connected to the capacitor.

5. A method of operating a ballast having a ballast input, a ballast input impedance $Z_{IN}$ as measured the across the ballast input and a filter coupled to the ballast input, having a filter output and characterized by an equivalent impedance $Z_{eg}$, comprising the steps of:

receiving at the ballast input from a utility power line under nominally rated ballast load conditions an alternating current having a peak amplitude;

drawing the alternating current through the filter, the filter further including a capacitor and an inductor having a core, the capacitor being coupled to at least a portion of the inductor and one of the filter output and ballast input, the core being substantially characterized by a B-H curve having a substantially linear region and a substantially non-linear region with a substantially uniform flux density existing throughout the core when in the non-linear region;

varying the relationship between the equivalent impedance $Z_{eq}$ and the ballast input impedance $Z_{IN}$ under nominally rated ballast load conditions such that $0.5 \leq Z_{eq}/Z_{IN} \leq 1.5$; and maintaining the core within the non-linear region of its B-H curve when at least at the peak amplitude of the alternating current under nominally rated ballast load conditions.

6. The method of claim 5, further including the step of filtering harmonics by passing a portion of the harmonics through the capacitor.

7. A ballast apparatus comprising:

input terminals for supplying, under nominally rated ballast load conditions, an alternating current having a peak amplitude, wherein the ballast apparatus has a ballast input equivalent impedance $Z_{IN}$ as measured across the ballast input, a filter coupled to the ballast input and having a filter output, inductor means having a magnetic core and a capacitor coupled to the output of the filter and at least a portion of the inductor means, wherein the filter has an equivalent impedance $Z_{eq}$ and the core is characterized by a B-H curve having a substantially linear region and a substantially non-linear region, and wherein, under nominally rated ballast load conditions, the core operates within the non-linear region of its B-H curve when the inductor means receives the peak amplitude of the alternating current, and the relationship between the equivalent impedance $Z_{eq}$ and the input impedance $Z_{IN}$ is $0.5 \leq Z_{eq}/Z_{IN} \leq 1.5$.

8. The ballast apparatus as claimed in claim 7 wherein said inductor means comprises a transformer having a magnetic core and first and second magnetically coupled inductors electrically connected to respective ones of said input terminals.

9. The ballast apparatus as claimed in claim 8 wherein the capacitor is coupled in parallel with at least a portion of said first inductor.

10. The ballast apparatus as claimed in claim 8 wherein the capacitor is connected in a series circuit with a further inductor and a resistor with the series circuit coupled in parallel with at least a portion of said first inductor.

11. The ballast apparatus as claimed in claim 10 further comprising a second capacitor coupled across the filter output.

12. The ballast apparatus as claimed in claim 10 wherein the filter output is coupled to an input of a rectifier circuit having its output coupled to an input of an inverter circuit.

13. The ballast apparatus as claimed in claim 7 wherein the normalized equivalent impedance of the filter, $Z_{eq}/Z_{IN}$, has a value of 0.68, whereby the total harmonic distortion (THD) of the input current to the ballast apparatus is less than 10%.

14. The ballast apparatus as claimed in claim 10 wherein said series circuit is connected between one output of the filter and a tap point on the first inductor.

15. The ballast apparatus as claimed in claim 7 wherein the capacitor is connected in a series circuit with a further inductor and a resistor with the series circuit connected between one output of the filter and a tap point on the inductor means.

16. The ballast apparatus as claimed in claim 7 wherein said inductor means comprises an inductor connected between one input terminal and one output of the filter, and the capacitor is connected in a series circuit with a further inductor and a resistor with the series circuit connected between said one output of the filter and a tap point on the inductor.

* * * * *